UNITED STATES PATENT OFFICE.

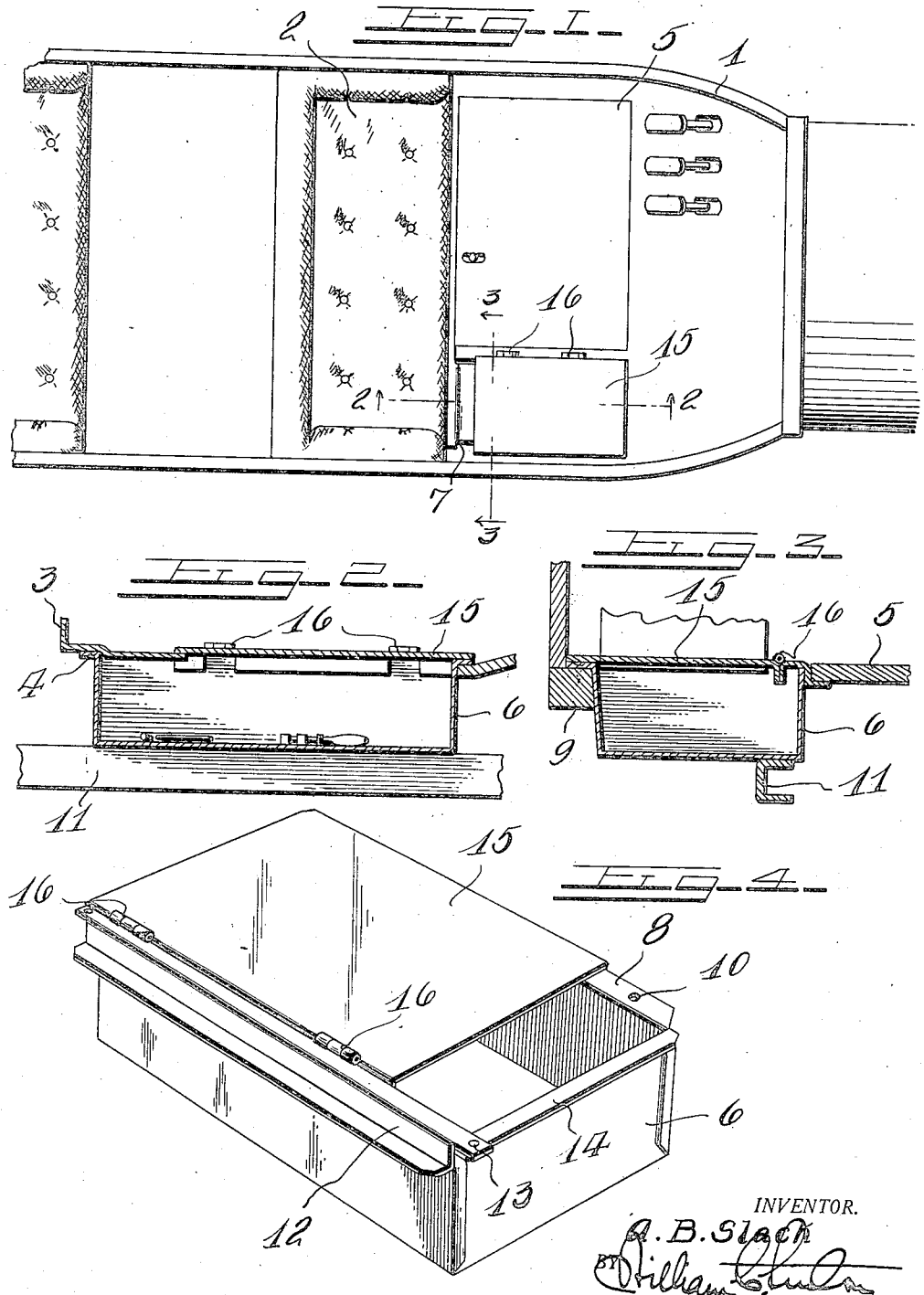

ALBERT BRINTON SLACK, OF SAN ANTONIO, TEXAS.

TOOL BOX.

1,421,732. Specification of Letters Patent. Patented July 4, 1922.

Application filed August 12, 1921. Serial No. 491,794.

*To all whom it may concern:*

Be it known that I, ALBERT B. SLACK, a citizen of the United States of America, residing at San Antonio, in the county of Bexar and State of Texas, have invented certain new and useful Improvements in Tool Boxes; and I do hereby declare that the following is a full, clear, and exact description of the same, such as will enable others skilled in the art to which it appertains to make and use the same.

This invention has reference to improvements in tool boxes, having for an object to provide a tool box for motor driven vehicles of the Ford design, which can be conveniently arranged in the flooring of the vehicle in proximity to the operator's seat with but slight alteration thereto and employed for retaining small tools such as are usually found in an automobile kit.

Heretofore, no provision has been made for the convenient carrying of tools in a Ford automobile, there being only a space under the rear seat of the touring type or in the luggage carrying compartment in the rear of the roadster type for this purpose. Such space, however, is quite inconvenient for the carrying of tools, since, often times the rear seat is occupied or the luggage compartment of the roadster type is crowded.

Other objects of my invention will be in part obvious and in part pointed out hereinafter.

In order that the invention and its mode of application may be readily understood by persons skilled in the art, I have in the accompanying illustrative drawings and in the detailed following description based thereon set out one embodiment of the same.

In these drawings:

Figure 1 is a fragmentary top plan of a touring design of a Ford automobile having my improved tool box arranged in the floor board thereof in proximity to the operator's seat;

Figure 2 is a vertical longitudinal section taken on the line 2—2 of Figure 1;

Figure 3 is a vertical transverse section taken on the line 3—3 of Figure 1; and, Figure 4 is a perspective view of the tool box.

Having more particular reference to the drawings in connection with which like characters of reference will designate corresponding parts throughout, 1 indicates the body of a Ford motor driven vehicle, the driver's seat, 2, of which is arranged upon a vertical transverse support 3 formed of sheet metal and having a laterally disposed flange 4 formed on the lower end of the forward side thereof. This flange is bent downwardly to provide a support for the floor board 5 of the vehicle whereby the same will be arranged flush with the rearward portion thereof and also with the bottom proper of the vehicle body. As will be noted, a portion of the floor board 5 is removed, thus providing a space between one end of the same and the adjacent side of the vehicle body 1. In this space, my improved tool box, which is rectangular in shape, is snugly arranged, the rear end of the box, as clearly shown in the Figure 2 extending rearwardly up under the laterally extended flange 4 on the seat support 3, said flange being cut as at 7 whereby it can be bent downwardly for a slight distance into the open top of the tool box and then afford means for preventing lateral displacement of the same with relation to the vehicle body.

In order that the tool box will be rigidly supported in position in the bottom of the vehicle body 1, a lateral or right angularly formed flange 8 is arranged upon the upper end of the outer side of the box and as shown in the Figure 3, engages over the bolster indicated at 9, an opening 10 being formed in said flange for the reception of a suitable fastening device which may be driven into said bolster 9. The bottom of the box 6 rests upon the substantially U-shaped bolster or truss 11 employed in the vehicle body construction. Thus, it will be understood that through the engagement of the flange 8 with the bolster 9 and the engagement of the tool box bottom with the truss 11 a stable support will be provided therefor, while due to the engagement of the cut portion 7 of the seat support 3 in the open top of the tool box, the same will be prevented from having any undue lateral movement upon the removal of the floor board 5.

In order that the adjacent end of the floor board 5 may be snugly supported with relation to the top of the tool box, a V-shaped strip 12 is arranged over the upper end of the opposite side of the tool box 6, as clearly shown in the Figure 4, and is joined to the box at its opposite end by rivets 13 or other suitable fastening devices which are engaged with angularly disposed flanges 14 on the opposite end walls of the box. The lower portion of this V-shaped strip 12, as will be noted, extends laterally from the adjacent side wall thereof and is disposed in a plane below that of the box top. Thus, the arrangement of the laterally extended portion of the V-shaped strip is such as to compensate for the thickness of the floor board 5 and by consequence, allows the same to be arranged flush with the tool box top.

A lid or cover 15 is hinged as at 16 to the inner side of the V-shaped strip 12 and is of a size sufficient to cover the exposed open top of said tool box, it being borne in mind that the inner end of the tool box is extended rearwardly under the lateral flange 4 of the seat support 3 and is accordingly closed thereby.

From the foregoing, it will be understood that I have provided an exceedingly convenient arrangement for the carrying of tools such as are usually required in an automobile kit, and by the novel arrangement of the tool box, prevent its interference with the space previously available in the vehicle. In the event that the flooring in the forward compartment of the vehicle body 1 is covered by mats or other covering, it of course will be understood that this covering may be readily bent upon itself to permit of the swinging of the hinged cover 15 to its full open position, or to such position as may be necessary to gain access to the box 6.

Manifestly, the construction shown is capable of considerable modification and such modification as is within the scope of my claims, I consider within the spirit of my invention.

I claim:

1. In combination with a motor driven vehicle having a portion of the floor board thereof removed, a tool box received in said removed portion having one end extended under the lower portion of the operator's seat support, means on one side of the box engageable with a portion of the vehicle body, other means on the opposite side of said box for receiving and supporting the adjacent end of the floor board, and a cover for the open top of said box.

2. In combination with a motor driven vehicle, a tool box received in the bottom of the vehicle body having one side thereof flanged at its upper end adapted for engagement with a portion of said vehicle body and one end thereof extended rearwardly under the flange of the operator's seat support, means on the opposite side of the box for receiving and supporting the adjacent end of the vehicle floor board thereupon flush with the top of the tool box and a hinged cover for the open top of the box.

3. In combination with a vehicle, a tool box received in the bottom of the vehicle body adjacent one side thereof having one end portion of the same extended rearwardly under a portion of the operator's seat support, a flange formed on one side wall of the box engageable with a portion of the vehicle body, the bottom of said box resting upon one of the vehicle body trusses, a V-shaped strip secured over the upper end of the opposite wall of said box having one portion thereof extended laterally from the same to snugly support the adjacent end of the vehicle floor board thereupon and a lid for the open top of said box hinged to the remaining portion of said V-shaped strip.

4. In combination with a vehicle, a tool box received in the bottom of the vehicle body having one end thereof extended under the flanged lower portion of the operator's seat support of the vehicle, a portion of said flange being cut away for engagement in the open top of the box, the upper end of one side of said box being flanged and adapted for engagement with a portion of the vehicle body, a longitudinally disposed V-shaped strip secured over the upper end of the opposite side wall of said box having one portion extending laterally from the box whereby to snugly support the adjacent end of the vehicle floor board thereupon with respect to the box top and a cover for the open top of said box hinged to the remaining portion of said V-shaped strip.

In witness whereof I have hereunto set my hand.

ALBERT BRINTON SLACK.